Sept. 17, 1929. O. S. JENNINGS 1,728,551
RELAY
Original Filed Aug. 6, 1920
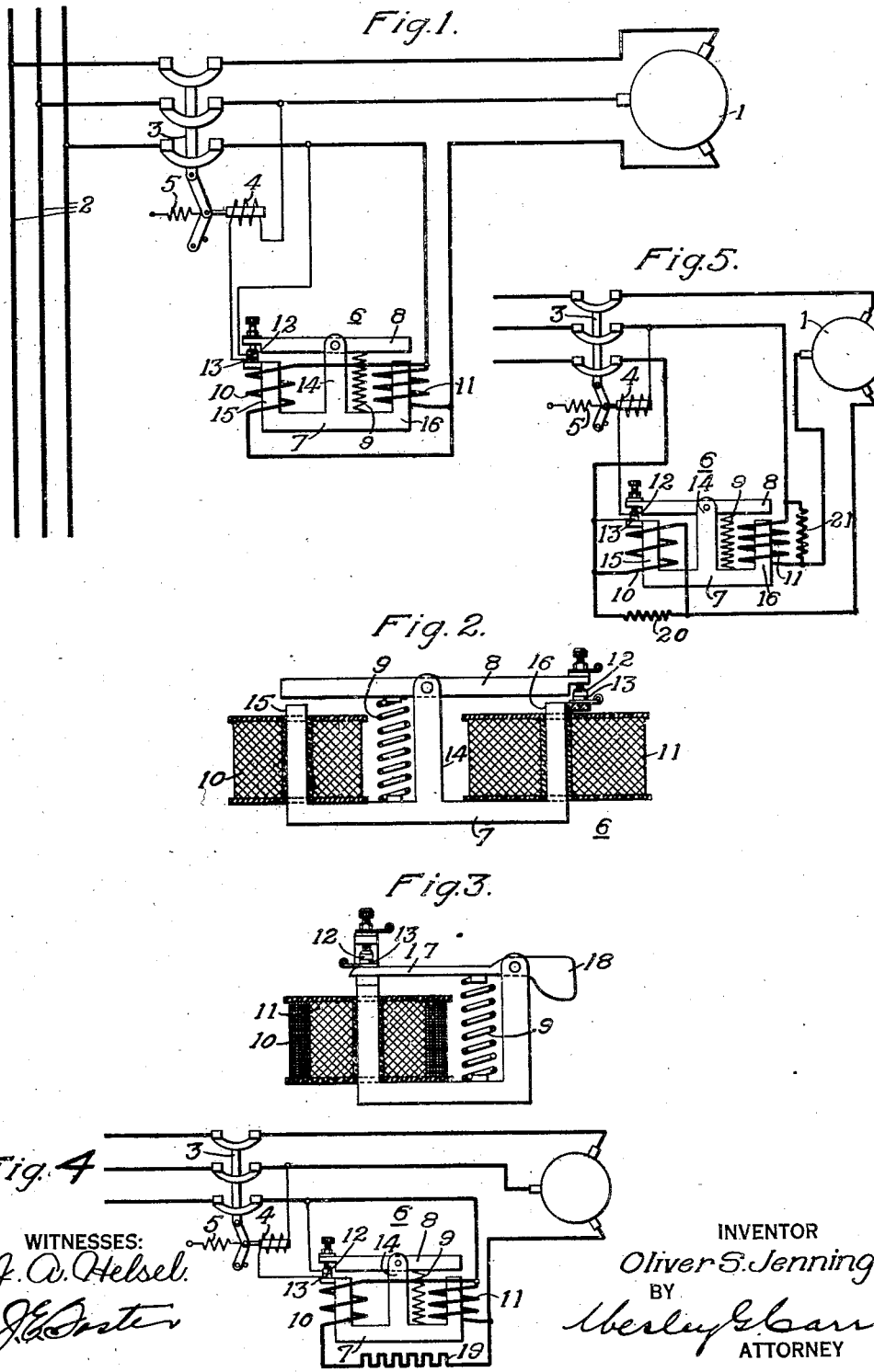
INVENTOR
Oliver S. Jennings
BY
ATTORNEY
WITNESSES:

Patented Sept. 17, 1929

1,728,551

UNITED STATES PATENT OFFICE

OLIVER S. JENNINGS, OF BROOKLYN, NEW YORK, ASSIGNOR TO WESTINGHOUSE ELECTRIC & MANUFACTURING COMPANY, A CORPORATION OF PENNSYLVANIA

RELAY

Application filed August 6, 1920, Serial No. 401,620. Renewed October 22, 1928.

My invention relates to relays and particularly to thermal relays.

One object of my invention is to provide a thermal relay for an electric circuit that shall reproduce temperature conditions that correspond to the conditions in apparatus connected to the circuit, and that shall operate to disconnect the apparatus from the circuit when predetermined temperature conditions obtain in the apparatus.

Another object of my invention is to provide a relay device, of the above-indicated character, that shall be simple and economical in construction and reliable in its operation.

My copending application, Serial No. 401,619, filed August 6, 1920, discloses a thermal relay comprising two windings that are differentially wound around a magnetizable core member. The windings have different resistance temperature coefficients and are so differentially wound with respect to the core member that the ampere turns or magnetizing forces of the two windings normally balance each other. As the windings become heated to a predetermined degree, the resultant unbalanced force actuates a movable armature to open the circuit of a holding magnet of an interrupter and permits the interrupter to open to disconnect the apparatus from the circuit from which it is normally energized.

In practicing my invention, I provide a magnetizable core member of substantially E-shape having a movable armature member so pivoted on the middle leg portion of the core member that it may move to engage either of the end leg portions of that member. A contact member is supported on the magnetizable core member and is adapted to be engaged by a contact member that is mounted on the movable armature member.

The core member has a winding disposed on each end portion thereof and has a spring so disposed, between the armature member and the core member, that the contact members are normally maintained in positive engagement. The windings are connected in parallel relation with each other but in series with a conductor of the electrical apparatus that is to be protected. The windings are normally so disposed that their ampere turns or magnetizing forces are equal and opposing. The windings are so proportioned that the respective resistances thereof are different but the ampere turns thereof are the same under normal conditions.

As the windings become heated by the current traversing the same, the temperatures developed therein approximate the temperatures obtaining in the electrical apparatus. As the temperature of the windings attains a predetermined value that corresponds to a dangerous operating temperature in the apparatus, the armature of the relay becomes so actuated by the resultant magnetizing force as to disengage the two contact members. The circuit of a holding magnet on the circuit interrupter is thereby interrupted and the interrupter is permitted to open to disconnect the apparatus from the source of energy.

Figure 1 of the accompanying drawings is a diagrammatic view of an electrical circuit that includes a device embodying my invention;

Fig. 2 is a side view, partially in elevation and partially in section, of a relay embodying my invention;

Fig. 3 is a modified form of the device shown in Fig. 2; and

Figs. 4 and 5 are diagrammatic views of circuits that include modified forms of the device shown in Fig. 2.

An electrical apparatus 1 is adapted to receive energy from a source 2 of electromotive force through a circuit-interrupting device 3 that is provided with a holding magnet 4 and a restraining spring 5. A protective relay 6 is provided to protect the apparatus 1 from overheating by interrupting the circuit of the holding magnet 4 to release the interrupter 3.

The relay 6 comprises a magnetizable core member 7 of the substantially E-shape, a movable armature member 8, a spring member 9, two windings 10 and 11 and two contact members 12 and 13. The armature member 8 is pivoted at a point intermediate the ends thereof on the middle leg portion 14 of the core member 7 and has the contact member 12 adjustably mounted at one end thereof. The spring 9 is so disposed between the core member 7 and the armature member 8 that the contact member 12 is caused to engage the stationary contact member 13 that is mounted on the core member. The windings 10 and 11 are mounted on the end leg portions 15 and 16, respectively, of the core member 7.

The windings 10 and 11 are wound with different numbers of turns but the ratio between the resistances of the two windings is such that, when they are connected in parallel, the ampere turns or magnetizing forces thereof will be equal. The windings are so disposed, however, on the core member 7 that the magnetizing forces oppose each other.

As the windings become heated by the current traversing the same, the winding that is traversed by the current of greater value becomes proportionally heated to a greater degree by the Joulean, or $I^2R$, losses and the resistance of that winding correspondingly increases more rapidly than the resistance of the other winding. The value of current that may traverse the heated winding is therefore decreased and the value of current that may traverse the second winding is relatively increased with a corresponding change in the ratio between the magnetizing forces that are developed by the respective windings.

As the relative change in temperature is increased with an increase of current in the apparatus 1, the effective, or resultant, magnetizing force increases. At a predetermined condition in the windings 10 and 11, that corresponds to a dangerous temperature condition in the apparatus 1, the effective magnetizing force, which is equivalent to the resultant between the magnetizing forces of the respective windings, becomes sufficient to actuate the armature 8 against the compression force of the spring 9. The consequent disengagement of the contact members 12 and 13 opens the circuit of the holding magnet 4 and permits the interrupter 3 to be opened by the spring 5.

The self and the mutual-inductive effects of the windings are such that the magnetizing forces, instead of being directly opposed, are so disposed that vectors representing the respective forces form an obtuse angle.

Moreover, a degree of unbalance obtains between the values of the magnetizing forces while the relay is traversed by current since the windings become heated thereby to a certain degree. The occurrence of a short circuit tends to so increase the magnetizing forces of the respective windings that the resultant magnetizing force is greatly magnified and the consequent operation of the relay is correspondingly accelerated.

The increase in the inductive effects of the windings tends to so change the relation between the magnetizing forces as to decrease the angular displacement therebetween. The resultant magnetizing force is correspondingly increased in accordance with the decrease in the angular displacement between the two forces.

The operation of the relay is effected at a definte value of the resultant magnetizing force. The occurrence of a short-circuit tends to increase the value of the respective magnetizing forces and to decrease the angular displacement therebetween by amplifying the inductive effects of the windings.

The occurrence of a short-circuit tends, therefore, to so accelerate the operation of the relay as to render it substantially instantaneous.

In Fig. 3 is illustrated a modified form of the device of Fig. 2, in which both windings are mounted on a common portion of the core member. The spring 9 serves to maintain the contact members 12 and 13 in engagement until predetermined temperature conditions obtain in the windings 10 and 11, whereupon the resultant magnetizing force so actuates the movable armature member 17 as to effect the disengagement of the contact members. In this form of device, the pivoted armature member 17 is provided with a counterbalancing portion 18.

The diagrammatic circuit that is illustrated in Fig. 4 illustrates another modification of the device of Fig. 2, in which both windings may have the same number of turns and an external resistor 19 used with one of the windings to control the value of the current that shall traverse the same.

The diagrammatic circuit that is illustrated in Fig. 5 illustrates a further modification wherein each winding is respectively connected in series with a different conductor. Resistors 20 and 21 are connected in parallel with the respective windings 10 and 11 and have such characteristics that the respective windings are so increasingly and decreasingly energized that the relay is caused to operate at a predetermined temperature in the windings, that corresponds to a dangerous temperature in the apparatus to be protected.

The unbalance that is necessary between the magnetizing forces to effect the operation of the relay may be obtained by various methods. The windings may normally have different values of resistance, as indicated above, and thus cause unequal development of heat in the respective windings. The windings may also have equal amounts of heat developed therein, but, because of differences in the respective sizes and in the radiation constants, the heat may be unequally radiated, or the resulting temperatures, with consequent changes in resistance, may be different due to the difference in the size and mass of the respective windings. Moreover, the windings may be equally heated and have equal radiation constants, but have different temperature resistance co-efficients which will disproportionately change the values of the resistance of the respective windings.

The variations in the resistance of the windings that may be caused by the heating thereof will so readjust the respective magnetizing forces developed thereby as to sufficiently unbalance the forces to effect the operation of the relay.

The windings 10 and 11 may also be so calibrated, that, below a predetermined temperature therein, the winding 11, that is disposed on the portion adjacent the contact members, may produce a magnetic force slightly greater than the force of the winding 10 to ensure a more positive engagement of the contact members. As the predetermined temperature is attained, the two forces equalize, and, when a second predetermined temperature of greater value is attained, the force that is produced by the winding 10 may increase to a value that is sufficient to operate the relay against the combined counter forces of the winding 11 and of the spring 9.

Although I have shown several forms of relays embodying my invention, I do not limit them to the specific structures that are illustrated since various modifications may be made therein within the spirit and scope of the invention as set forth in the appended claims.

I claim for my invention:

1. A thermal relay for an electric circuit comprising a magnetizable element provided with two linked magnetic circuits, means energized from the electric circuit for setting up opposing magnetic forces in the respective magnetic circuits and adapted to set up a preponderating force in one or the other magnetic circuit depending upon the temperature attained in said means, and a biased circuit-controlling element actuable in a predetermined direction by the corresponding magnetic force when the temperature of the magnetizing means attains a predetermined value beyond which the preponderating magnetic force is sufficient to actuate the controlling element.

2. A thermal relay for an electric circuit comprising a biased circuit-controlling member, and means for establishing two magnetic forces for actuating the controlling member in one or another direction, said means comprising two differentially effective windings having such temperature-resistance characteristics as to actuate the control member in one direction until a temperature is attained therein indicating a dangerous condition in the associated circuit and to actuate the control member in the opposite direction after such condition is attained.

3. A relay comprising a core of substantially E-shape, an armature cooperating therewith and pivotally mounted on the central leg of said core, two parallel-connected windings on the outer legs of said core, respectively, said windings being normally opposed in their magnetic effect on said armature and having different temperature coefficients of resistance.

4. A relay comprising a movable armature, means including two parallel-connected windings for respectively moving said armature in two directions, the magnetic effects of said windings on said armature being normally in opposition and said windings having different temperature coefficients of resistance.

5. A relay comprising a movable member, a winding therefor for influencing said member in one direction and a shunt winding for the first-named winding to influence said member in an opposite direction, said windings having different coefficients of resistance, whereby actuation of the movable member may be effected at a predetermined temperature of the windings.

In testimony whereof, I have hereunto subscribed my name this 29th day of July, 1920.

OLIVER S. JENNINGS.